(12) United States Patent
Pyun

(10) Patent No.: US 10,985,830 B2
(45) Date of Patent: Apr. 20, 2021

(54) RADIO RELAY APPARATUS AND OPERATING METHOD THEREFOR

(71) Applicant: KT Corporation, Seongnam-si (KR)

(72) Inventor: Sung-Yeop Pyun, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/608,540

(22) PCT Filed: Mar. 6, 2018

(86) PCT No.: PCT/KR2018/002628
§ 371 (c)(1),
(2) Date: Oct. 25, 2019

(87) PCT Pub. No.: WO2018/199461
PCT Pub. Date: Nov. 1, 2018

(65) Prior Publication Data
US 2020/0204249 A1    Jun. 25, 2020

(30) Foreign Application Priority Data
Apr. 28, 2017  (KR) ........................ 10-2017-0055664

(51) Int. Cl.
*H04B 7/155*    (2006.01)
*H04B 7/26*    (2006.01)
(Continued)

(52) U.S. Cl.
CPC ..... *H04B 7/15507* (2013.01); *H04B 7/15535* (2013.01); *H04B 7/15557* (2013.01);
(Continued)

(58) Field of Classification Search
CPC ............ H04B 7/15507; H04B 7/15535; H04B 7/15557; H04B 7/2606; H04J 3/06; H04J 14/02; H04W 5/0055
See application file for complete search history.

(56) References Cited

U.S. PATENT DOCUMENTS

2016/0294441 A1    10/2016    Fazlollahi et al.

FOREIGN PATENT DOCUMENTS

| CN | 102362446 A | 2/2012 |
| JP | 2000-078065 A | 3/2000 |

(Continued)

OTHER PUBLICATIONS

International Search Report for PCT/KR2018/002628 dated Jun. 5, 2018 [PCT/ISA/210].

*Primary Examiner* — Yuwen Pan
*Assistant Examiner* — Angelica M Perez
(74) *Attorney, Agent, or Firm* — Sughrue Mion, PLLC

(57) ABSTRACT

A radio relay apparatus and an operating method therefor are provided.

The radio relay apparatus that relays a communication signal between a base station and a terminal includes a donor unit that transmits and receives a radio frequency signal to and from the base station, and at least one service unit that transmits and receives an analog transmission signal to and from the donor unit, and transmits and receives the radio frequency signal to and from the terminal. In the analog transmission signal, an intermediate frequency signal into which the radio frequency signal is converted and a time synchronization signal extracted from the intermediate frequency signal are combined. The time synchronization signal is used by the donor unit and the at least one service unit for time division duplex communication (TDD) synchronization control.

23 Claims, 14 Drawing Sheets

(51) Int. Cl.
*H04J 3/06* (2006.01)
*H04J 14/02* (2006.01)
*H04W 56/00* (2009.01)

(52) U.S. Cl.
CPC .............. *H04B 7/2606* (2013.01); *H04J 3/06* (2013.01); *H04J 14/02* (2013.01); *H04W 56/0045* (2013.01)

(56) References Cited

FOREIGN PATENT DOCUMENTS

| | | |
|---|---|---|
| JP | 2003-018075 A | 1/2003 |
| JP | 2004-229242 A | 8/2004 |
| JP | 2008-236047 A | 10/2008 |
| JP | 2009-182367 A | 8/2009 |
| JP | 2010-114728 A | 5/2010 |
| JP | 2012-105103 A | 5/2012 |
| KR | 10-2005-0107044 * | 11/2005 |
| KR | 10-2005-0107044 A | 11/2005 |
| KR | 10-2006-0036656 A | 5/2006 |
| KR | 10-2008-0107795 * | 11/2008 |
| KR | 10-2008-0107795 A | 12/2008 |
| KR | 10-0895177 B1 | 5/2009 |
| KR | 10-1566295 B1 | 11/2015 |

* cited by examiner

RADIO RELAY APPARATUS AND OPERATING METHOD THEREFOR

CROSS REFERENCE TO RELATED APPLICATIONS

This application is a National Stage of International Application No. PCT/KR2018/002628, filed on Mar. 6, 2018, which claims priority from Korean Patent Application No. 10-2017-0055664, filed on Apr. 28, 2017.

TECHNICAL FIELD

The present invention relates to a radio relay apparatus and an operating method therefor.

BACKGROUND ART

Generally, a radio wave emitted from a base station in a mobile communication system has difficulty in reaching the inside of a large building, the back side of a mountain or a hill, or a tunnel, a subway, or the like. Thus, such an area is likely to be unavailable for mobile communication. Accordingly, a shaded area is provided due to the position or geography of the base station. As measures for reducing the above-described shaded area, a repeater capable of covering a shaded area in which the telephone service is unavailable, with low cost and a weak radio wave, is used.

In particular, an in-building optical repeater is a device that supplements a shaded area in a building and eliminating voice-of-customer (VoC). In general, a radio coverage is established by routing a radio frequency (FR) cable and installing an antenna in the building. However, in a case where cable routing in the building is limited, or covering of a small shaded area is intended, a donor antenna is installed outside the building, and an RF repeater that receives a signal from a base station in a radio RF manner, transmits the signal into the building, and provides a radio coverage through a service antenna is used.

In a long term evolution (LTE) service or 3G (WCDMA, wideband code division multiple access) service, which uses a frequency band of 5 GHz or less in the related art, RF repeater transmits an RF signal received from a base station of the outside of the building into the inside of the building through an RF cable.

However, a 5th generation (5G) service using a millimeter wave uses a superhigh frequency band. Thus, if the millimeter wave is propagated through an RF cable, it is not possible to provide the service because of problems such as restriction in transmission length and performance degradation.

In particular, in a case where a 5G base station operates in time division duplex (TDD), the RF repeater needs to operate in synchronization with the base station, in accordance with transmission timings (Time-Sync, T-Sync) in an uplink and a downlink.

DISCLOSURE

The present invention has been made in an effort to provide a radio relay apparatus and an operating method therefor in which a donor unit and a service unit transmit and receive a communication signal to and from each other with an intermediate frequency (IF) by an analog transmission method.

An exemplary embodiment of the present invention provides a radio relay apparatus that relays a communication signal between a base station and a terminal. The radio relay apparatus includes a donor unit that transmits and receives a radio frequency signal to and from the base station, and at least one service unit that transmits and receives an analog transmission signal to and from the donor unit, and transmits and receives the radio frequency signal to and from the terminal.

The donor unit converts the radio frequency signal into an intermediate frequency (IF) signal, and combines the intermediate frequency (IF) signal and a time synchronization signal to generate the analog transmission signal. The time synchronization signal is used by the donor unit and the at least one service unit for time division duplex (TDD) communication synchronization control.

The at least one service unit may separate the time synchronization signal from the analog transmission signal to extract the intermediate frequency (IF) signal, convert the intermediate frequency (IF) signal into the radio frequency signal, and transmit the radio frequency signal to the terminal.

The time synchronization signal may be detected from the converted intermediate frequency (IF) signal.

In the analog transmission signal, the intermediate frequency (IF) signal and the time synchronization signal may be combined using a frequency division multiplexing technique.

The donor unit and the at least one service unit perform time division duplex communication (TDD) synchronization control based on a reference signal and the time synchronization signal. The reference signal may be periodically shared by the donor unit and the at least one service unit.

In the analog transmission signal, the intermediate frequency (IF) signal and the time synchronization signal may be combined using a wavelength division multiplexing (WDM) technique.

The analog transmission signal may include the intermediate frequency (IF) signal having an analog optical signal form and the time synchronization signal having a digital optical signal form.

The donor unit may include at least one donor antenna that transmits and receives an uplink radio frequency signal and a downlink radio frequency signal to and from the base station, an intermediate frequency (IF) converter that converts the downlink radio frequency signal into the intermediate frequency (IF) signal, a time synchronization signal extractor that extracts the time synchronization signal from the intermediate frequency (IF) signal, a transmission/reception controller that controls a transmission/reception switching operation for setting an uplink path and a downlink path based on a reference signal shared with the service unit and the time synchronization signal, a first digital-analog converter that converts the time synchronization signal into an analog signal, an analog transmitter that generates a downlink analog transmission signal by combining or multiplexing the intermediate frequency (IF) signal and the time synchronization signal converted into the analog signal and transmits the downlink analog transmission signal to the service unit through the analog transmission, an analog receiver that receives an uplink analog transmission signal in an intermediate frequency (IF) band, from the service unit, and a radio frequency converter that converts the uplink analog transmission signal in the intermediate frequency (IF) band into a radio frequency signal in a service frequency band.

The donor unit may include at least one donor antenna that transmits and receives an uplink radio frequency signal and a downlink radio frequency signal to and from the base station, an analog receiver that receives an uplink analog transmission signal in an intermediate frequency (IF) band, from the service unit, a radio frequency converter that converts the uplink analog transmission signal in the intermediate frequency (IF) band into a radio frequency signal in a service frequency band, an intermediate frequency (IF) converter that converts the downlink radio frequency signal into the intermediate frequency (IF) signal, a time synchronization signal extractor that extracts the time synchronization signal from the intermediate frequency (IF) converter, a transmission/reception controller that controls a transmission/reception switching operation for setting an uplink path and a downlink path based on a reference signal shared with the service unit and the time synchronization signal, and an optical signal combiner that transmits an optical transmission signal including the intermediate frequency (IF) signal as an analog optical transmission signal and the time synchronization signal as a digital optical transmission signal, to the service unit through an analog transmission cable.

The service unit may include at least one service antenna that transmits and receives an uplink radio frequency signal and a downlink radio frequency signal to and from the terminal, an analog receiver that receives a downlink analog transmission signal from the donor unit and separates the downlink analog transmission signal into the intermediate frequency (IF) signal and the time synchronization signal, a radio frequency converter that converts the intermediate frequency (IF) signal into the downlink radio frequency signal in a service frequency band, a first analog/digital converter that converts the time synchronization signal into a digital signal, a transmission/reception controller that controls a transmission/reception switching operation for setting an uplink path and a downlink path based on a reference signal shared with the donor unit and the time synchronization signal, an intermediate frequency (IF) converter that converts the uplink radio frequency signal received from the terminal through the service antenna, into an intermediate frequency (IF) signal, and an analog transmitter that transmits the intermediate frequency (IF) signal to the donor unit through an analog transmission cable.

The service unit may include at least one service antenna that transmits and receives an uplink radio frequency signal and a downlink radio frequency signal to and from the terminal, an optical signal separator that receives an optical transmission signal including the intermediate frequency (IF) signal as an analog optical transmission signal and the time synchronization signal as a digital optical transmission signal from the donor unit, and separates and outputs the intermediate frequency (IF) signal and the time synchronization signal, a radio frequency converter that converts the intermediate frequency (IF) signal into the downlink radio frequency signal in a service frequency band, a transmission/reception controller that controls a transmission/reception switching operation for setting an uplink path and a downlink path based on the time synchronization signal and a reference signal shared with the donor unit, an intermediate frequency (IF) converter that converts the uplink radio frequency signal received from the terminal through the service antenna, into an intermediate frequency (IF) signal, and an analog transmitter that transmits the intermediate frequency (IF) signal to the donor unit through an analog transmission cable.

Another embodiment of the present invention provides an operating method of a donor unit in a radio relay apparatus including the donor unit that transmits and receives a radio frequency signal to and from a base station and a service unit that transmits and receives the radio frequency signal to and from a terminal. The operating method includes receiving the radio frequency signal from the base station, converting the radio frequency signal into an intermediate frequency (IF) signal, generating an analog transmission signal including a time synchronization signal and the intermediate frequency (IF) signal, and transmitting the analog transmission signal to the service unit through an analog cable.

The operating method may further include, after the converting, detecting the time synchronization signal from the intermediate frequency (IF) signal, and converting the time synchronization signal into an analog time synchronization signal. In the generating of the analog transmission signal, the analog transmission signal is generated by combining or multiplexing the analog time synchronization signal and the intermediate frequency (IF) signal.

In the generating of the analog transmission signal, the analog transmission signal in which the intermediate frequency (IF) signal and the time synchronization signal are combined may be generated using a wavelength division multiplexing (WDM) technique.

The analog transmission cable may be an optical cable.

The generating of the analog transmission signal may include generating an analog optical signal from the intermediate frequency (IF) signal, generating a digital optical transmission signal from the time synchronization signal, and generating the analog transmission signal including the analog optical signal and the digital optical transmission signal. In the transmitting, the analog optical signal and the digital optical transmission signal may be simultaneously transmitted with optical wavelengths different from each other.

Yet another embodiment of the present invention provides an operating method of a service unit in a radio relay apparatus including the donor unit that transmits and receives a radio frequency signal to and from a base station and the service unit that transmits and receives the radio frequency signal to and from a terminal. The operating method includes receiving an analog transmission signal from the donor unit through an analog cable, separating a time synchronization signal from the analog transmission signal, converting an intermediate frequency (IF) signal obtained by separating the time synchronization signal, into a radio frequency signal in a predetermined frequency band, and transmitting the converted radio frequency signal to the service unit. The time synchronization signal is used in the donor unit and the service unit for time division duplex (TDD) communication synchronization control.

The analog transmission cable may be an optical cable.

The analog transmission signal may include the intermediate frequency (IF) signal and the time synchronization signal which are simultaneously received with optical wavelengths different from each other. The intermediate frequency (IF) signal may have an analog optical signal form, and the time synchronization signal may have a digital optical transmission signal form.

Yet another embodiment of the present invention provides a radio relay apparatus that relays a communication signal between a base station and a terminal. The radio relay apparatus includes a donor unit that transmits and receives radio frequency signals in at least two or more service bands different from each other, to and from the base station, and at least one service unit that is connected to the donor unit, and transmits and receives the radio frequency signal to and from the terminal. The donor unit and the at least one service unit convert a radio frequency signal in a first service band of the two or more service bands into an intermediate frequency (IF) signal, and transmit and receive the converted signal to and from each other through an analog transmission cable, and transmit and receive a radio frequency signal itself in another service band of the two or more service bands to and from each other. The intermediate frequency (IF) signal is converted into the radio frequency signal in the first service band by the service unit and then is transmitted to the terminal, or is converted into the radio frequency signal in the first service band by the donor unit and then is transmitted to the base station.

The donor unit and the at least one service unit may transmit and receive an analog transmission signal to and from each other. The analog transmission signal may include the intermediate frequency (IF) signal into which the radio frequency signal in the first service band is converted, and a time synchronization signal extracted from the intermediate frequency (IF) signal.

The donor unit and the at least one service unit may transmit and receive the intermediate frequency (IF) signal to and from each other through the analog transmission cable, and transmit and receive the time synchronization signal to and from each other through a frequency-shift keying modem.

The donor unit and the at least one service unit may transmit and receive an analog transmission signal in which the intermediate frequency (IF) signal and the time synchronization signal are combined using a frequency division multiplexing technique, to and from each other.

The donor unit and the at least one service unit may transmit and receive an analog transmission signal in which the intermediate frequency (IF) signal and the time synchronization signal are combined using a wavelength division multiplexing (WDM) technique, to and from each other.

The donor unit and the at least one service unit may transmit and receive the intermediate frequency (IF) signal to and from each other by an analog optical transmission method, and transmit and receive the time synchronization signal to and from each other by a digital optical transmission method. The intermediate frequency (IF) signal and the time synchronization signal may be simultaneously transmitted and received.

Yet another embodiment of the present invention provides an operating method of a donor unit in a radio relay apparatus including the donor unit that transmits and receives a radio frequency signal to and from a base station and a service unit that transmits and receives the radio frequency signal to and from a terminal. The operating method includes converting the radio frequency signal into an intermediate frequency (IF) signal in a case where a service band of the radio frequency signal received from the base station is a first service band among two or more different radio frequency bands allowing transmission and reception to and from the base station, transmitting the intermediate frequency (IF) signal to the service unit through an analog transmission cable, and transmitting the received radio frequency signal itself to the service unit through the analog transmission cable in a case where the service band is other than the first service band.

In the transmitting of the intermediate frequency (IF) signal to the service unit through the analog transmission cable, a time synchronization signal extracted from the intermediate frequency (IF) signal and the intermediate frequency (IF) signal may be transmitted by one transmission method selected from a first transmission method, a second transmission method, and a third transmission method. The first transmission method may include an analog transmission method of combining or multiplexing the intermediate frequency (IF) signal and the time synchronization signal. In the second transmission method, the intermediate frequency (IF) signal may be transmitted through the analog transmission cable, and the time synchronization signal may be transmitted through a frequency-shift keying (FSK) modem. In the third transmission method, the intermediate frequency (IF) signal may be transmitted by the analog optical transmission method, and the time synchronization signal may be transmitted by the digital optical transmission method.

According to an embodiment of the present invention, it is possible to provide a 5G millimeter wave service by transmitting a signal of a base station, which is received by radio RF, into a building. In addition, it is possible to synchronize timings of an RF repeater and a base station with each other by extracting and providing an uplink transmission timing and a downlink transmission timing from a signal of the base station operating in TDD. Thus, when an in-building coverage is established, it is possible to significantly reduce establishment time and cost in a case where cable routing in the building is limited, or covering a small shaded area is intended.

In addition, it is possible to provide a service with a signal of the known LTE or 3G base station together.

MODE FOR INVENTION

Figure 1:
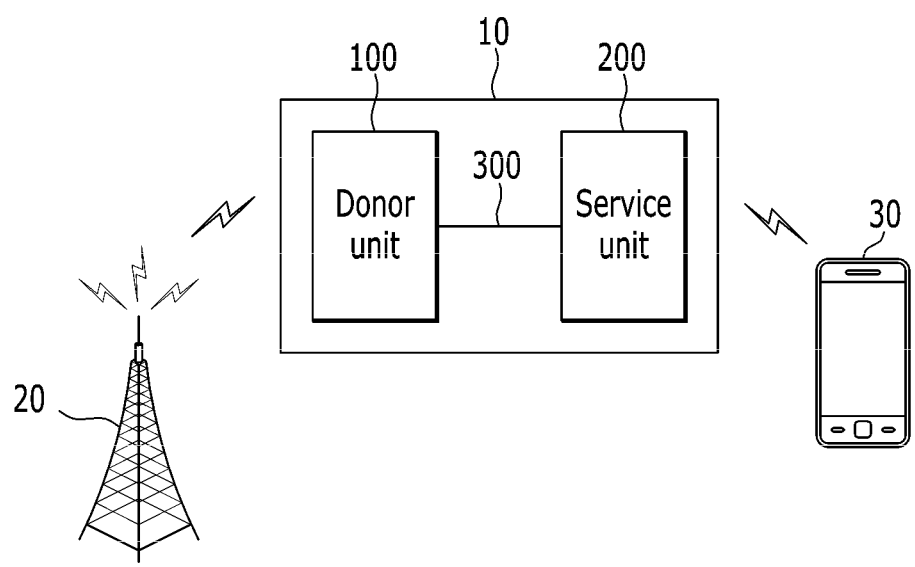
FIG. 1 is a block diagram illustrating a configuration of a radio relay system according to an exemplary embodiment of the present invention.

In the following detailed description, only certain exemplary embodiments of the present invention have been shown and described, simply by way of illustration. However, the present invention is not limited to the exemplary embodiments described herein, and may be implemented in various forms. Accordingly, the drawings and description are to be regarded as illustrative in nature and not restrictive. Like reference numerals designate like elements throughout the specification. In addition, in descriptions with reference to the accompanying drawings, the same components regardless of drawing numbers are denoted by the same reference numerals, and repetitive descriptions will be omitted.

In addition, unless explicitly described to the contrary, the word "comprise" and variations such as "comprises" or "comprising", will be understood to imply the inclusion of stated elements but not the exclusion of any other elements.

In addition, the terms such as " . . . unit", " . . . device", and " . . . module" described in the specification mean a unit that processes at least one function or operation, which may be implemented by hardware, software, or a combination of hardware and software.

In the specification, a terminal may be referred to as a mobile station (MS), a mobile terminal (MT), a subscriber station (SS), a portable subscriber station (PSS), a user equipment (UE), an access terminal (AT), and the like. The terminal may include all or some functions of the mobile terminal, the subscriber station, the portable subscriber station, the user equipment, and the like.

In the specification, a base station (BS) may be referred to as an access point (AP), a radio access station (RAS), a node B, a base transceiver station (BTS), an MMR (mobile multihop relay)-BS, and the like. The base station may include all or some functions of the access point, the radio access station, the node B, the base transceiver station, the MMR-BS.

A radio relay apparatus and an operating method therefore according to an exemplary embodiment of the present invention will be described in detail with reference to the drawings.

Figure 2:
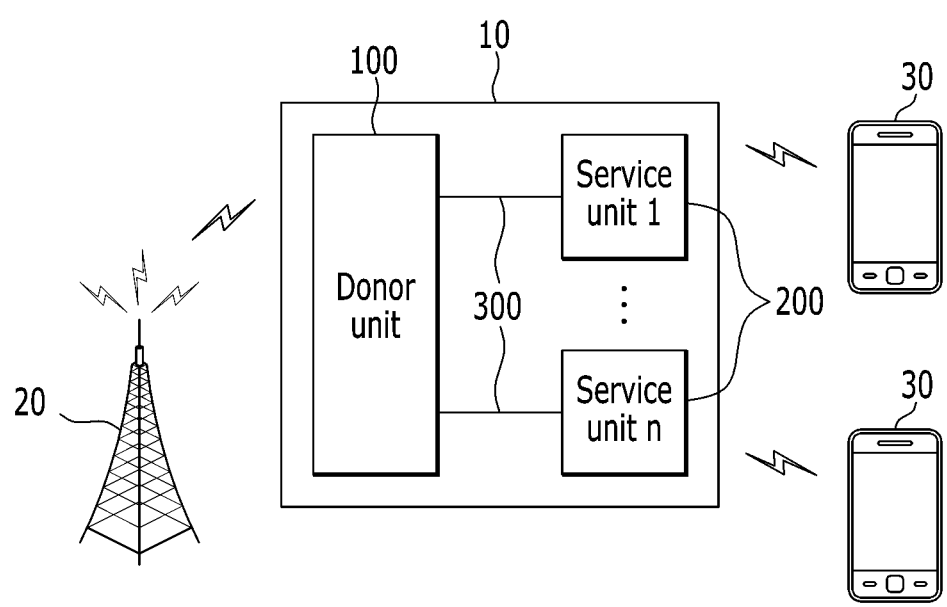
FIG. 2 is a block diagram illustrating a configuration of a radio relay system according to another exemplary embodiment of the present invention.

FIG. 1 is a block diagram illustrating a configuration of a radio relay system according to an exemplary embodiment of the present invention. FIG. 2 is a block diagram illustrating a configuration of a radio relay system according to another exemplary embodiment of the present invention.

With reference to FIG. 1, the radio relay system includes a radio relay apparatus 10, a base station 20, and a terminal 30. The radio relay apparatus 10 relays a communication signal which is transmitted and received between the base station 20 and the terminal 30. The radio relay apparatus 10 uses a time division duplex (TDD) scheme. Here, the TDD scheme is a bidirectional transmission scheme in which uplink transmission and downlink transmission are alternately assigned in time in the same frequency band.

The radio relay apparatus 10 includes a donor unit 100, a service unit 200, and an analog transmission cable 300. The donor unit 100 and the service unit 200 are connected to each other through the analog transmission cable 300. Normally, the donor unit 100 is installed outside a building, for example, on the roof of the building. The service unit 200 is installed in the building.

At this time, as illustrated in FIG. 2, in the radio relay apparatus 10, one donor unit 100 is connected to multiple service units 200.

The donor unit 100 transmits and receives a communication signal to and from the base station 20. The service unit 200 transmits and receives a communication signal to and from the terminal 30. At this time, the base station 20 and the donor unit 100 communicate with each other using a service frequency signal. The donor unit 100 and the service unit 200 communicate with each other using a transmission frequency signal. The service unit 200 and the terminal 30 communicate with each other using the service frequency signal.

In an example, the service frequency signal may be a 5G signal in a millimeter wave (mmWave) band. In another example, the service frequency signal may be a signal in a superhigh frequency band of 30 to 300 GHz.

The transmission frequency signal may be an analog intermediate frequency (intermediate frequency, referred to as "IF" below) signal.

The donor unit 100 and the service unit 200 performs downlink transmission relay and uplink transmission relay.

In the downlink transmission relay, the donor unit 100 receives a radio frequency (RF) signal transmitted from the base station 20 and converts the received radio frequency signal into an analog IF signal. The donor unit 100 detects a time synchronization (Timing Sync) signal from the analog IF signal and generates an analog transmission signal including the time synchronization signal and the analog IF signal. The donor unit 100 transmits the generated analog transmission signal to the service unit 200 through the analog transmission cable 300.

The service unit 200 separates the time synchronization signal from the analog transmission signal received through the analog transmission cable 300. The service unit 200 converts the analog IF signal obtained by separating the time synchronization signal, into an RF signal and transmits the RF signal to the terminal 30 in radio.

In the uplink transmission relay, the service unit 200 converts an RF signal received from the terminal 30 into an analog IF signal and transmits the analog IF signal to the donor unit 100 through the analog transmission cable 300. The donor unit 100 converts the analog IF signal received from the service unit 200 into an RF signal and transmits the RF signal to the base station 20.

At this time, the time synchronization signal is used when the donor unit 100 and the service unit 200 controls timing synchronization for uplink transmission and downlink transmission.

The analog transmission cable 300 is a medium for propagating the analog IF signal and may include an RF cable and an optical cable, for example.

Thus, in the radio relay apparatus 10 according to the exemplary embodiment of the present invention, the donor unit 100 and the service unit 200 transmit and receive the analog IF signal to and from each other, and thus it is possible to solve a problem caused by restriction in transmission length and performance degradation occurring when a millimeter wave is propagated in the RF cable in the related art. In addition, since the donor unit 100 shares the time synchronization signal detected from the RF signal received from the base station 20, with the service unit 200, the radio relay apparatus can operate in synchronization with the base station.

A detailed configuration of the donor unit 100 will be described with reference to FIGS. 3 to 6 for each example. A detailed configuration of the service unit 200 will be described with reference to FIGS. 7 to 10 for each example.

Figure 3:
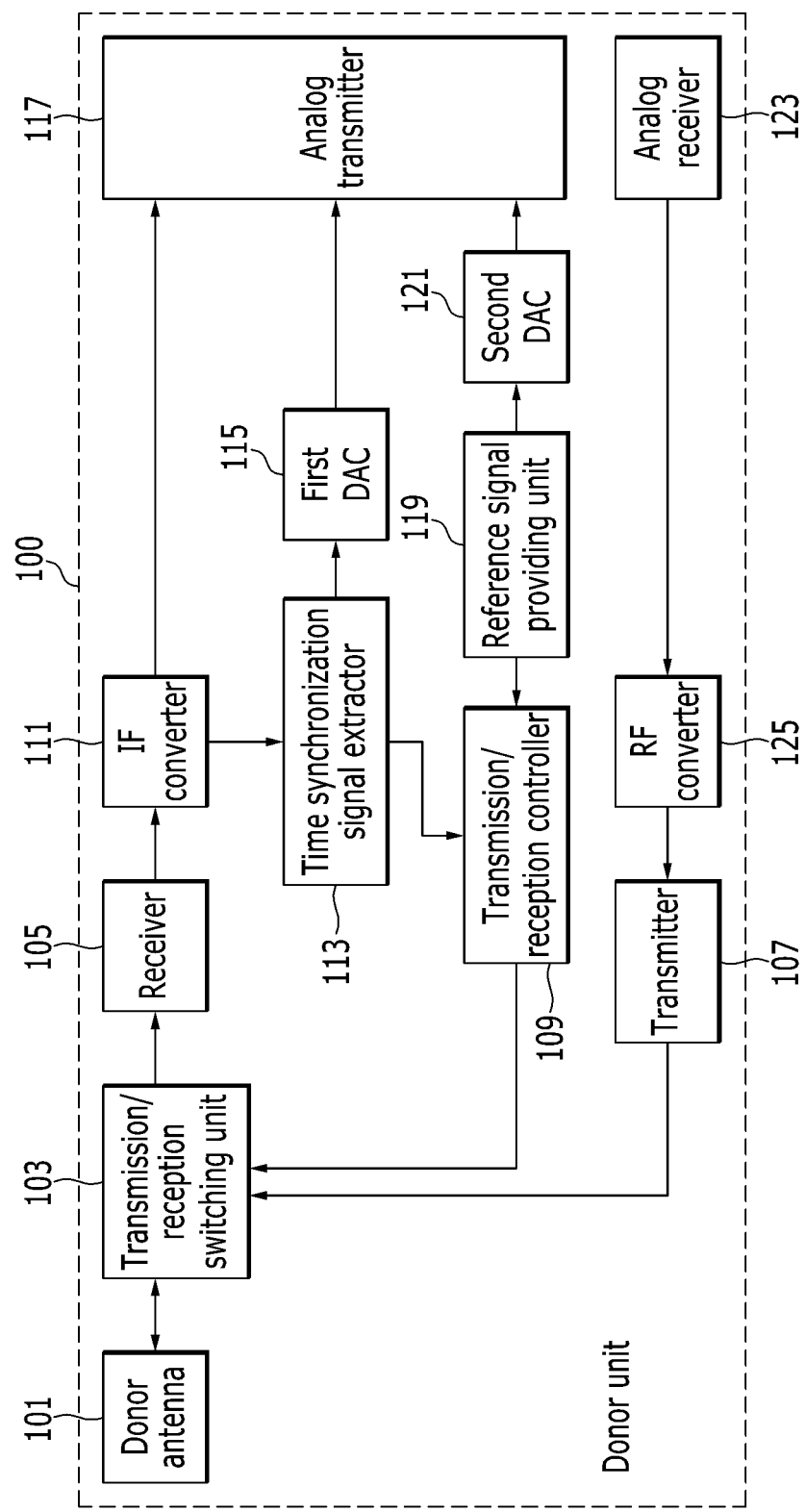
FIG. 3 is a block diagram illustrating a detailed configuration of a donor unit according to an example in the present invention.

Firstly, FIG. 3 is a block diagram illustrating the detailed configuration of the donor unit according to an example in the present invention.

With reference to FIG. 3, the donor unit 100 includes a donor antenna 101, a transmission/reception switching unit 103, a receiver 105, a transmitter 107, a transmission/reception controller 109, an IF converter 111, a time synchronization signal extractor 113, a first digital-analog converter (referred to as "DAC" below) 115, an analog transmitter 117, a reference signal providing unit 119, a second DAC 121, an analog receiver 123, and an RF converter 125.

The donor antenna 101 is an RF antenna capable of transmitting and receiving an RF signal to and from the base station 20 through an aerial wire. The donor antenna 101 receives an RF signal from the base station 20 to form a downlink signal path, and transmits an RF signal received from the terminal 30 through the service unit 200 to the base station 20 so as to form an uplink signal path.

The transmission/reception switching unit 103 divides the input RF signal into a downlink signal and an uplink signal by a switching signal. The transmission/reception switching unit 103 switches or turns on and off transmission and reception paths in accordance with a switching signal from the transmission/reception controller 109. That is, when a switching signal for controlling a downlink is input from the transmission/reception controller 109, the transmission/reception switching unit 103 forms a reception path connecting the donor antenna 101 to the receiver 105. When a switching signal for controlling an uplink is input from the transmission/reception controller 109, the transmission/reception switching unit 103 forms a transmission path connecting the transmitter 107 to the donor antenna 101.

The receiver 105 and the transmitter 107 may include various filters, converters, amplifiers, and the like required for processing a communication signal after the communication signal is received or before the communication signal is transmitted, or may perform operations corresponding to the above components.

The transmission/reception controller 109 generate a switching signal for switching transmission and reception paths based on a time synchronization signal input from the time synchronization signal extractor 113 and a reference signal input from the reference signal providing unit 119. The transmission/reception controller 109 outputs the generated switching signal to the transmission/reception switching unit 103.

The IF converter 111 converts an RF signal in a first service band, which is input from the receiver 105 into an IF signal. Here, the first service band may include a millimeter wave band or a superhigh frequency band.

The time synchronization signal extractor 113 extracts a time synchronization signal from the IF signal output by the IF converter 111. At this time, since the extracted time synchronization signal is a digital signal, the time synchronization signal is converted into an analog signal by the first DAC 115 and is output to the analog transmitter 117.

For a method in which the time synchronization signal extractor 113 extracts the time synchronization signal from the IF signal, various examples can be made. In an example, the time synchronization signal extractor 113 demodulates the IF signal to extract and analyze synchronization, and thus acquires synchronization. That is, the time synchronization signal extractor calculates starting points of a falling signal and a rising signal included in the IF signal. Assuming that a modulation method in the base station 20 is already known, the time synchronization signal extractor 113 detects the time synchronization signal based on the modulation method in the base station 20. However, the example is not limited to such a configuration, and various time synchronization detection modules already disclosed can be used.

The analog transmitter 117 generates an analog transmission signal including an IF signal output by the IF converter 111 and the time synchronization signal output by the first DAC 115. Such an analog transmission signal may include an analog transmission signal in a single line.

In an example, the analog transmitter 117 may multiplex the IF signal and the time synchronization signal. At this time, the time synchronization signal may be transmitted in any first frequency band adjacent to an IF band. The time synchronization signal may be transmitted in any frequency band among multiple frequency bands usable in the analog transmission cable 300. The analog transmitter 117 transmits an analog transmission signal in which the IF signal and the time synchronization signal are combined or multiplexed, to the service unit 200 through the analog transmission cable 300.

In another example, the analog transmitter 117 may transmit the IF signal through the analog transmission cable 300 and transmit the time synchronization signal by a frequency-shift keying (FSK) method.

In yet another example, the analog transmitter 117 may generate and transmit an analog transmission signal in which the IF signal and the time synchronization signal are combined or multiplexed using a wavelength division multiplexing (WDM) technique. In such an example, an optical cable is used as the analog transmission cable 300. An optical module (not illustrated) is mounted at the rear end of the analog transmitter 117, and thus the analog transmission signal may be electrophotic-converted, and then be transmitted to the service unit 200.

The reference signal providing unit 119 outputs a reference signal for downlink switching and uplink switching to the transmission/reception controller 109. The reference signal providing unit 119 generates the reference signal, causes the second DAC (121) to convert the reference signal into the analog signal, and then outputs the analog signal to the analog transmitter 117. The reference signal providing unit 119 may output the reference signal acquired from the base station 20 or generate the reference signal with a predetermined algorithm.

The analog transmitter 117 transmits the reference signal output by the reference signal providing unit 119 to the service unit 200 through the analog transmission cable 300.

The analog receiver 123 receives an analog transmission signal from the service unit 200 through the analog transmission cable 300.

The RF converter 125 converts the analog transmission signal input from the analog receiver 123 into an RF signal and outputs the RF signal to the transmitter 107.

Figure 4:
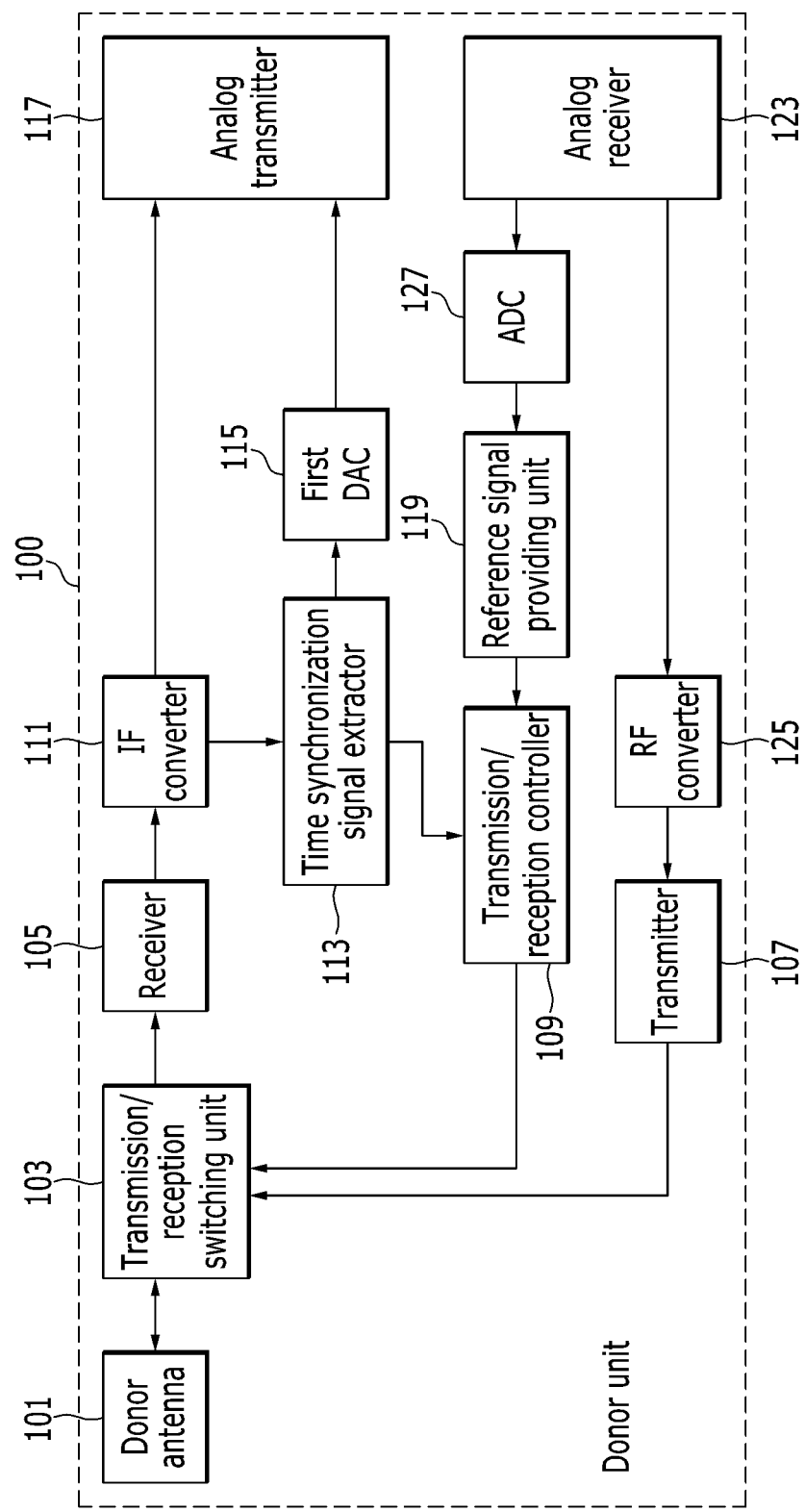
FIG. 4 is a block diagram illustrating the detailed configuration of the donor unit according to another example in the present invention.

Next, FIG. 4 is a block diagram illustrating the specific configuration of the donor unit according to another example in the present invention and corresponds to a case where the donor unit receives the reference signal from the service unit.

With reference to FIG. 4, the donor unit 100 includes the donor antenna 101, the transmission/reception switching unit 103, the receiver 105, the transmitter 107, the transmission/reception controller 109, the IF converter 111, the time synchronization signal extractor 113, the first DAC 115, the analog transmitter 117, the reference signal providing unit 119, the analog receiver 123, the RF converter 125, and an analog-to-digital converter (referred to as "ADC" below) 127. Here, descriptions of the same components (101, 103, 105, 107, 111, 113, 115, 117, and 125) as those in FIG. 3 will be omitted.

The reference signal providing unit 119 receives a reference signal transmitted by the service unit 200, from the analog receiver 123. The reference signal providing unit causes the ADC 127 to convert the analog reference signal to a digital signal and outputs the digital signal to the transmission/reception controller 109. In this case, the donor unit 100 and the service unit 200 may have a configuration of 1:1 correspondence.

Figure 5:
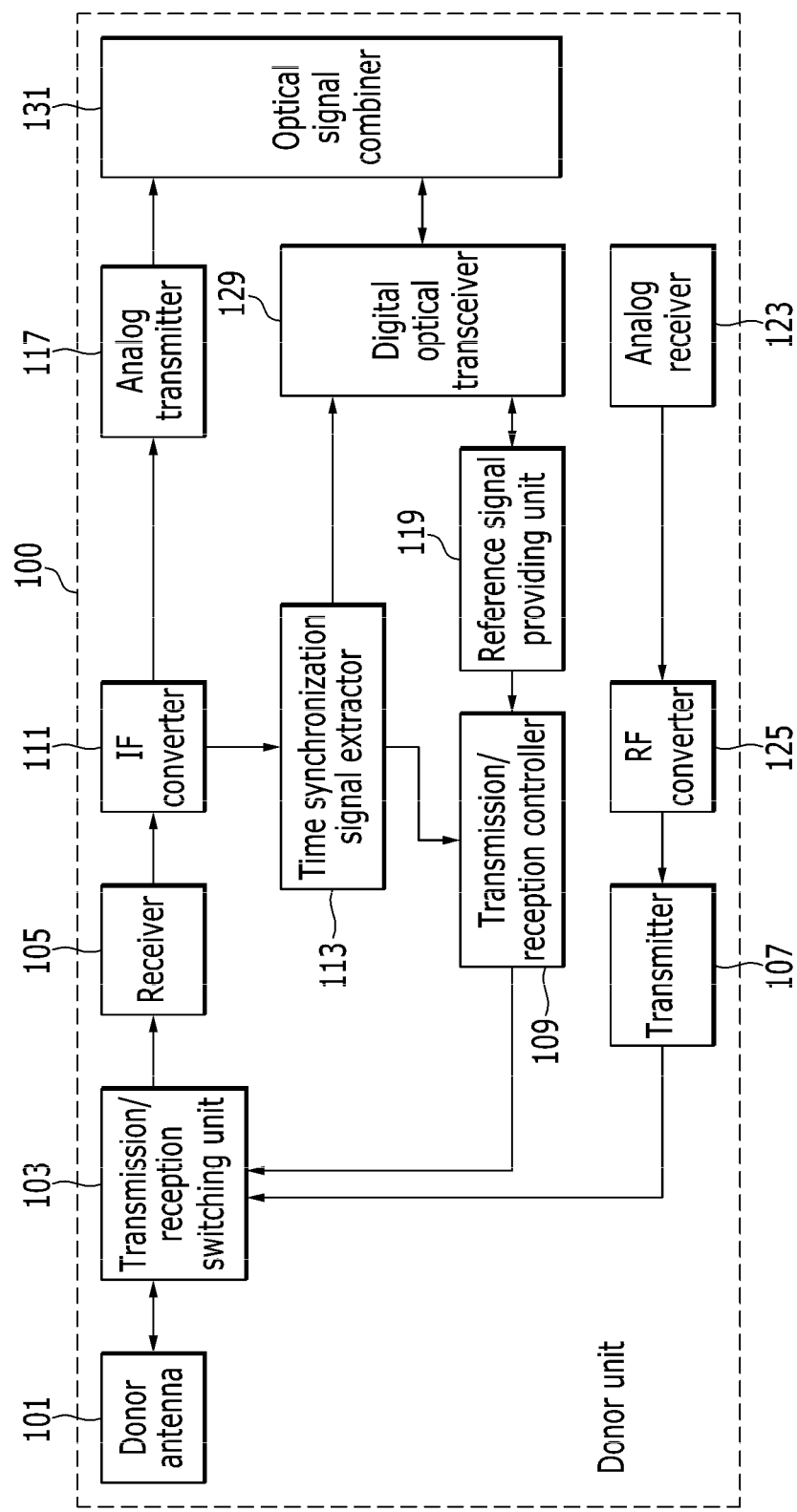
FIG. 5 is a block diagram illustrating the detailed configuration of the donor unit according to yet another example in the present invention.

Next, FIG. 5 is a block diagram illustrating the detailed configuration of the donor unit according to yet another example in the present invention and corresponds to a case where a data signal and a control signal are transmitted and received by different optical signals in an optical transmission method. Here, the data signal may mean the IF signal, and the control signal may mean the time synchronization signal.

With reference to FIG. 5, the donor unit 100 includes the donor antenna 101, the transmission/reception switching unit 103, the receiver 105, the transmitter 107, the transmission/reception controller 109, the IF converter 111, the time synchronization signal extractor 113, the analog transmitter 117, the reference signal providing unit 119, the analog receiver 123, the RF converter 125, a digital optical transceiver 129, and an optical signal combiner 131. Here, descriptions of the same components (101, 103, 105, 107, 109, 111, 113, 123, and 125) as those in FIGS. 3 and 4 will be omitted.

The analog transmitter 117 outputs the IF signal (that is, data signal) output by the IF converter 111 to the optical signal combiner 131.

The digital optical transceiver 129 outputs the time synchronization signal output by the time synchronization signal extractor 113 to the optical signal combiner 131.

The optical signal combiner 131 generates an optical-combined signal using the IF signal output by the analog transmitter 117 and the time synchronization signal output by the digital optical transceiver 129 and transmits the optical-combined signal to the service unit 200 through the analog transmission cable 300.

At this time, the optical signal combiner 131 may be implemented as a wavelength division multiplexing (WDM) modem. The optical signal combiner 131 transmits the IF signal and the time synchronization signal subjected to wavelength division multiplexing, to the service unit 200 through the analog transmission cable 300 being an optical cable.

The optical signal combiner 131 can simultaneously transmit and receive an analog optical signal and a digital optical signal. The optical signal combiner 131 may simultaneously transmit the IF signal having an analog signal form and the time synchronization signal having a digital signal form to the service unit 200 by a wavelength division multiplexing (WDM) method.

In addition, the digital optical transceiver 129 transmits a digital reference signal output by the reference signal providing unit 119 to the service unit 200 through the analog transmission cable 300. Alternatively, the digital optical transceiver may output the reference signal received from the service unit 200 through the analog transmission cable 300, to the reference signal providing unit 119.

At this time, the analog transmission cable 300 is an optical cable. The analog transmitter 117 corresponds to an analog optical transmitter, and the analog receiver 123 corresponds to an analog optical receiver.

The reference signal providing unit 119 may generate the reference signal and transmit the reference signal to the service unit 200 through the digital optical transceiver 129 and the optical signal combiner 131. At this time, the reference signal may be transmitted with an optical wavelength different from those for the IF signal and the time synchronization signal.

In addition, the reference signal providing unit 119 may receive the reference signal from the service unit 200 through the digital optical transceiver 129.

Figure 6:
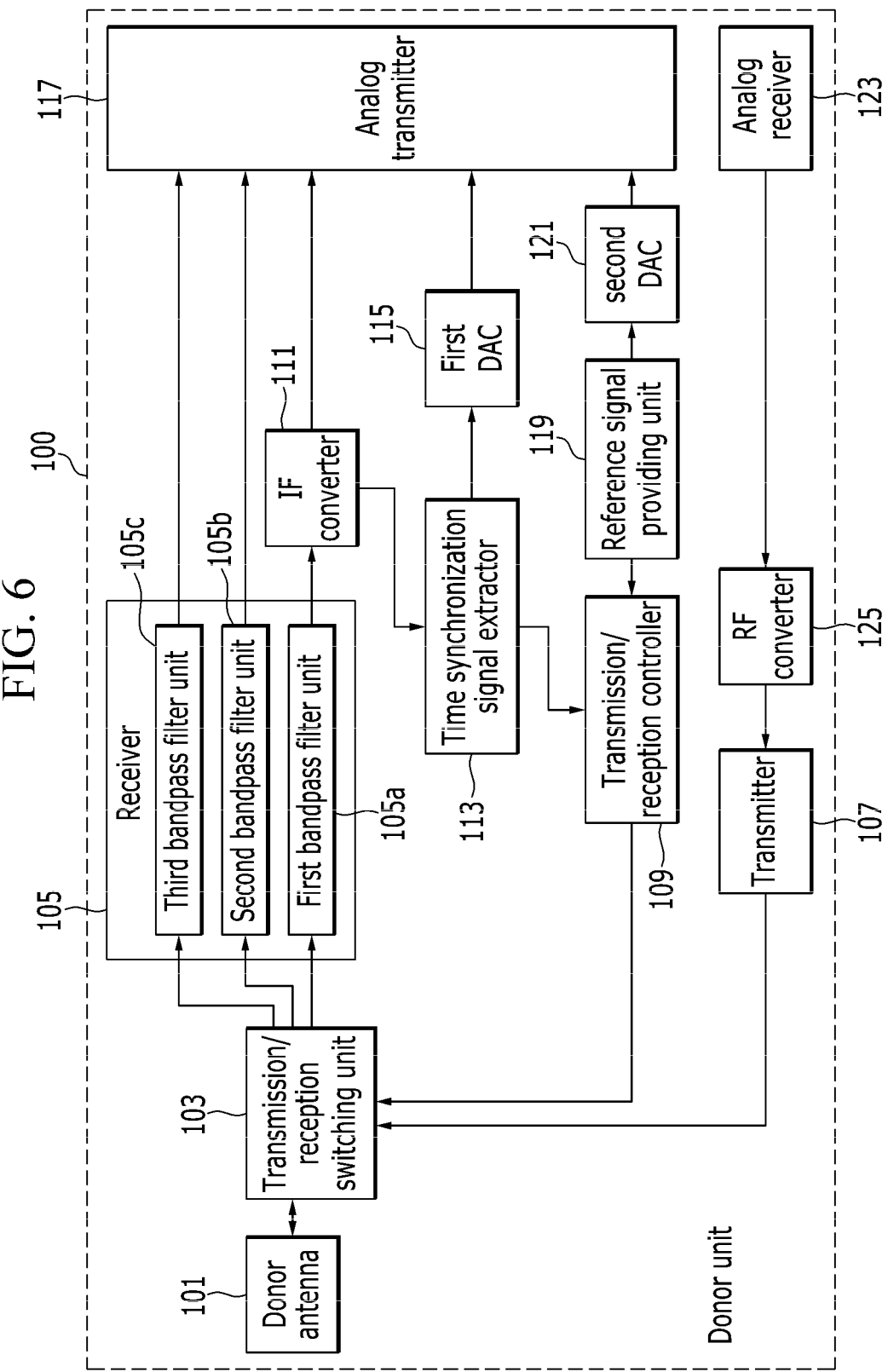
FIG. 6 is a block diagram illustrating the detailed configuration of the donor unit according to yet another example in the present invention.

Next, FIG. 6 is a block diagram illustrating the specific configuration of the donor unit according to yet another example in the present invention and corresponds to a case where the donor unit is capable of adopting frequency bands different from each other. At this time, the example in FIG. 6 can be implemented from the configuration in FIGS. 3, 4, and 5, but uses the configuration in FIG. 3 as an example. Here, descriptions of the same components as those in FIG. 3 will be omitted.

With reference to FIG. 6, the receiver 105 recognizes a frequency band of the RF signal received through the donor antenna 101. If the frequency band is a predetermined first service band, the receiver outputs the received RF signal to the IF converter 111 and outputs an RF signal in a service band other than the first service band to the analog transmitter 117.

At this time, the donor antenna 101 may include a single antenna dedicated for the first service band and a multi-antenna for at least one service band other than the first service band.

The receiver 105 may include multiple (n) bandpass filter units 105a, 105b, and 105c that filter different frequency bands.

The first bandpass filter unit 105a filters a first RF signal input from the transmission/reception switching unit 103 and outputs the filtered signal to the IF converter 111. The first RF signal may include a 5G signal in a millimeter wave band.

The second bandpass filter unit 105b filters a second RF signal input from the transmission/reception switching unit 103 and outputs the filtered signal to the analog transmitter 117.

The third bandpass filter unit 105c filters a third RF signal input from the transmission/reception switching unit 103 and outputs the filtered signal to the analog transmitter 117.

Here, for the second RF signal and the third RF signal, a long term evolution (LTE) frequency and a 3G frequency, and the like may be used.

As described above, the RF signal using a specific frequency may be converted into the IF signal and may be transmitted, and the RF signal in another service band itself may be output and transmitted through the analog transmitter 117.

According to the exemplary embodiment of the present invention, the RF signal itself received from an LTE or 3G base station is transmitted by an analog transmission method without being changed to the IF signal. Thus, it is possible to provide a service with not only a signal of a 5G base station but also a signal of an LTE or a 3G base station together.

The service unit 200 includes a reception and transmission configuration corresponding to the examples of the donor unit 100 described above. The service unit will be described as follows for each example.

Figure 7:
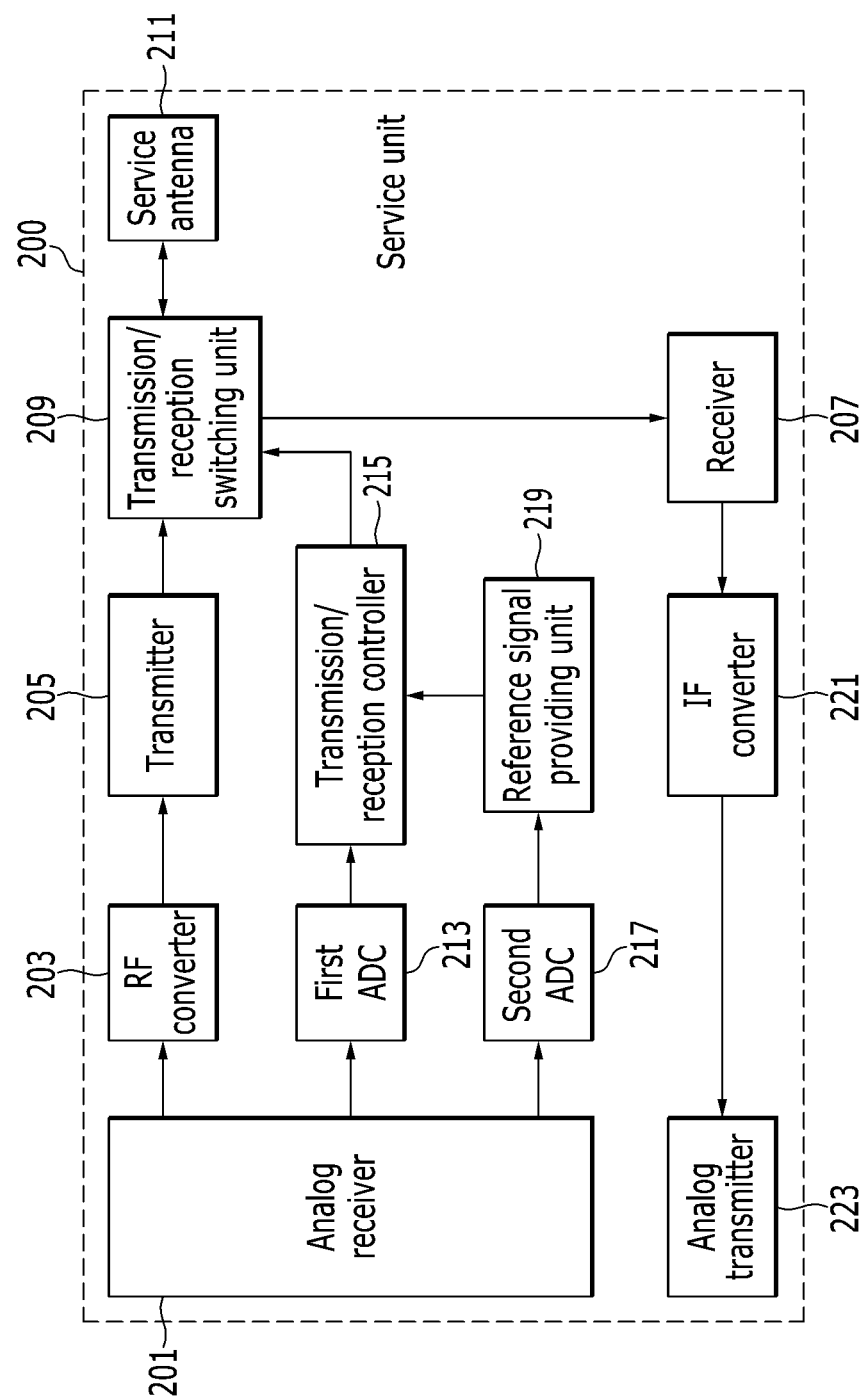
FIG. 7 is a block diagram illustrating a detailed configuration of a service unit according to an example in the present invention.

FIG. 7 is a block diagram illustrating a detailed configuration of the service unit according to an example in the present invention and corresponds to the example in FIG. 3.

With reference to FIG. 7, the service unit 200 includes an analog receiver 201, an RF converter 203, a transmitter 205, a receiver 207, a transmission/reception switching unit 209, a service antenna 211, a first ADC 213, a transmission/reception controller 215, a second ADC 217, a reference signal providing unit 219, an IF converter 221, and an analog transmitter 223.

The analog receiver 201 separates an IF signal and a time synchronization signal from an analog transmission signal received through the analog transmission cable 300. The analog receiver outputs the IF signal to the RF converter 203 and outputs the time synchronization signal to the first ADC 213. The analog receiver 201 is a component corresponding to the analog transmitter 223 in FIG. 3. For example, the IF signal and the time synchronization signal transmitted in different frequency bands may be detected by a demultiplexing technique.

The analog receiver 201 outputs a reference signal received from the donor unit 100 to the second ADC 217.

The RF converter 203 converts the IF signal output from the analog receiver 201 into an RF signal in a predetermined radio frequency band, that is, a service frequency band for the base station 20 and the terminal 30, and outputs the RF signal to the transmitter 205.

The transmitter 205 and the receiver 207 may include various filters, converters, amplifiers, and the like required for processing a communication signal after the communication signal is received or before the communication signal is transmitted, or may perform operations corresponding to the above components.

The transmission/reception switching unit 209 divides the input RF signal into a downlink signal and an uplink signal by a switching signal. When a switching signal for controlling a downlink is input from the transmission/reception controller 215, the transmission/reception switching unit 209 forms a transmission path connecting the transmitter 205 to the service antenna 211. When a switching signal for controlling an uplink is input from the transmission/reception controller 215, the transmission/reception switching unit 209 forms a reception path connecting the service antenna 211 to the receiver 207.

The service antenna 211 radiates the RF signal subjected to signal processing at a predetermined level, to the terminal 30.

The first ADC 213 converts the time synchronization signal output from the analog receiver 201 into a digital signal and outputs the digital signal to the transmission/reception controller 215.

The transmission/reception controller 215 generates a switching signal for performing switching between uplink transmission and downlink transmission, based on the time synchronization signal and the reference signal, and outputs the generated switching signal to the transmission/reception switching unit 209.

The second ADC 217 converts the reference signal output from the analog receiver 201 into a digital signal and outputs the digital signal to the reference signal providing unit 219.

The reference signal providing unit 219 receives the reference signal from the donor unit 100 through the analog receiver 201 and outputs the received reference signal to the transmission/reception controller 215.

The IF converter 221 converts the RF signal transmitted from the receiver 207 into the IF signal and outputs the IF signal to the analog transmitter 223.

The analog transmitter 223 transmits the IF signal to the donor unit 100.

Figure 8:
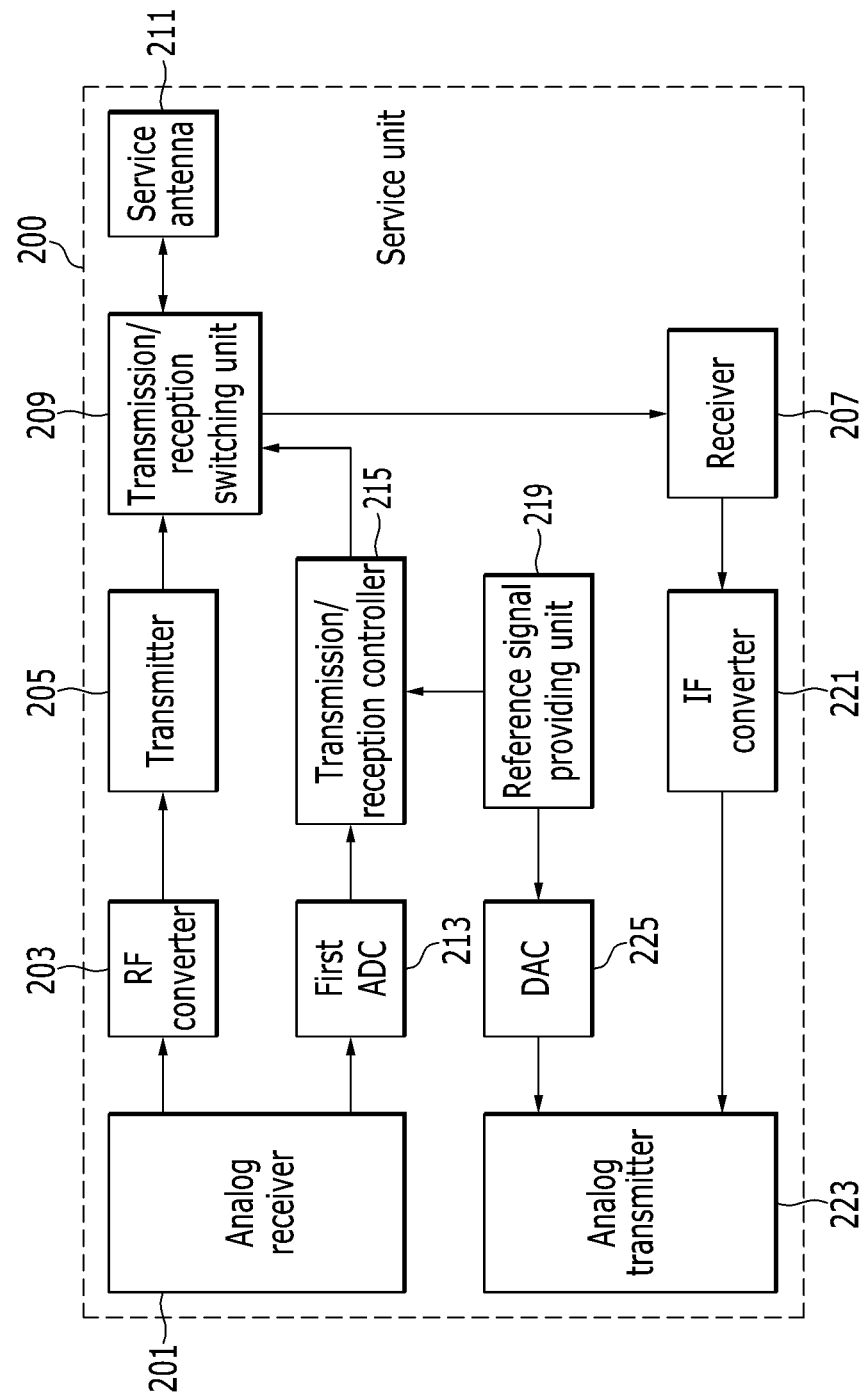
FIG. 8 is a block diagram illustrating the detailed configuration of the service unit according to another example in the present invention.

FIG. 8 is a block diagram illustrating the specific configuration of the service unit according to another example in the present invention. FIG. 8 corresponds to a case where the service unit provides the reference signal and corresponds to the example in FIG. 4. Here, descriptions of the same components as those in FIG. 7 will be omitted.

With reference to FIG. 8, the service unit 200 includes the analog receiver 201, the RF converter 203, the transmitter 205, the receiver 207, the transmission/reception switching unit 209, the service antenna 211, the first ADC 213, the transmission/reception controller 215, the reference signal providing unit 219, the IF converter 221, the analog transmitter 223, and a DAC 225.

The reference signal providing unit 219 generates and outputs a reference signal for downlink switching and uplink switching to the transmission/reception controller 215. Then, the DAC 225 may convert the reference signal into an analog signal, and the analog transmitter 223 may transmit the analog signal to the donor unit 100. At this time, the reference signal providing unit 219 may generate the reference signal with a predetermined algorithm.

Figure 9:
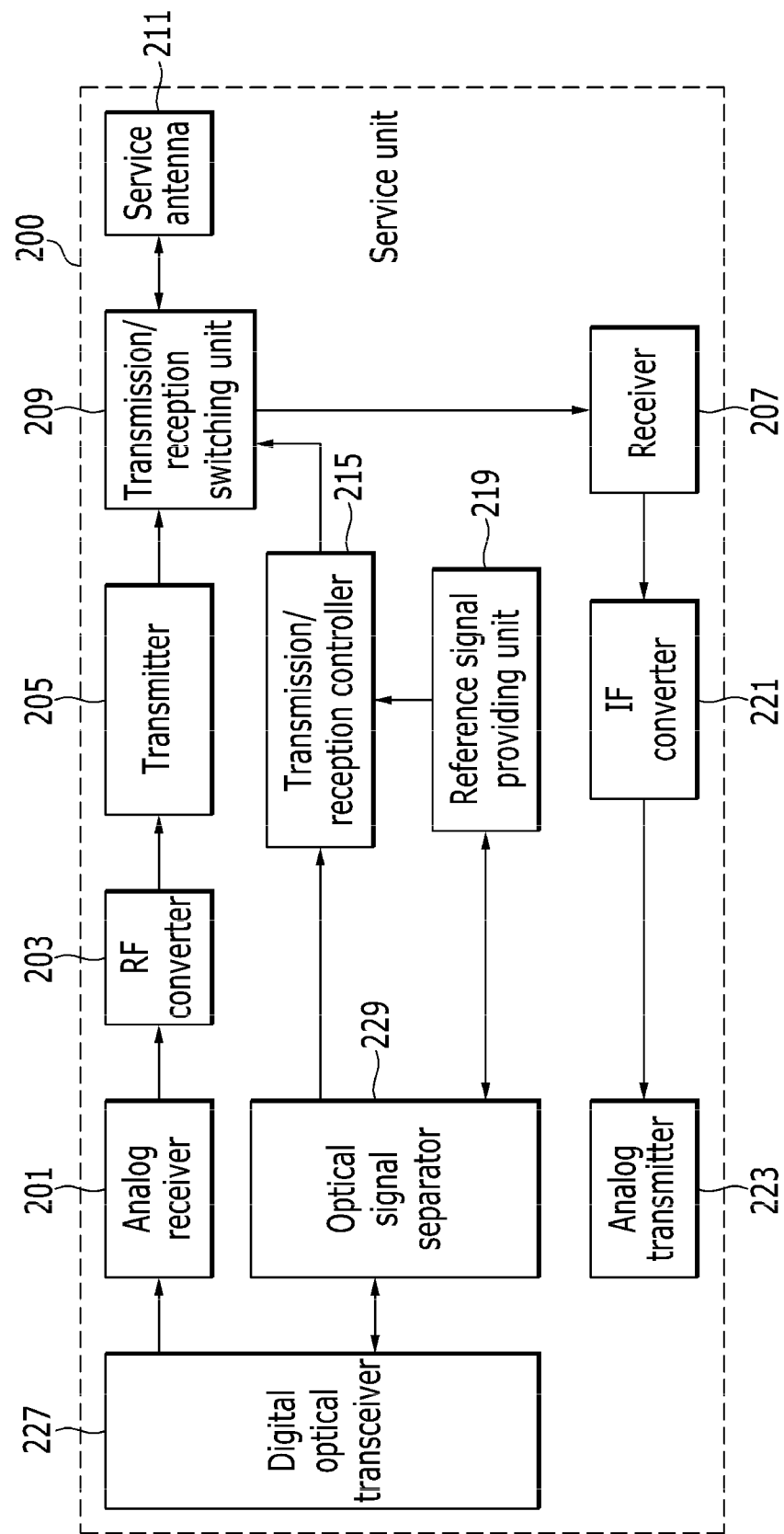
FIG. 9 is a block diagram illustrating the detailed configuration of the service unit according to yet another example in the present invention.

Next, FIG. 9 is a block diagram illustrating the detailed configuration of the service unit according to yet another example in the present invention. FIG. 9 corresponds to a case where a data signal and a control signal are transmitted and received by different optical signals in an optical transmission method and corresponds to the example in FIG. 5. Here, descriptions of the same components as those in FIGS. 7 and 8 will be omitted.

The service unit 200 includes the analog receiver 201, the RF converter 203, the transmitter 205, the receiver 207, the transmission/reception switching unit 209, the service antenna 211, the transmission/reception controller 215, the reference signal providing unit 219, the IF converter 221, the analog transmitter 223, the optical signal separator 227, and a digital optical transceiver 229.

Here, the optical signal separator 227 is a component corresponding to the optical signal combiner 131 in FIG. 5, and separates an optical signal subjected to wavelength division multiplexing into an IF signal and a time synchronization signal by a demultiplexing technique.

The optical signal separator 227 outputs the IF signal to the analog receiver 201 and outputs the time synchronization signal to the digital optical transceiver 229.

In addition, the optical signal separator 227 may receive a digital reference signal from the donor unit 100 with an optical wavelength different from those of the IF signal and the time synchronization signal. The digital optical transceiver 229 outputs the received digital reference signal to the reference signal providing unit 219. In addition, the optical signal separator 227 transmits the reference signal generated by the reference signal providing unit 219 to the donor unit 100 with an optical wavelength.

Figure 10:
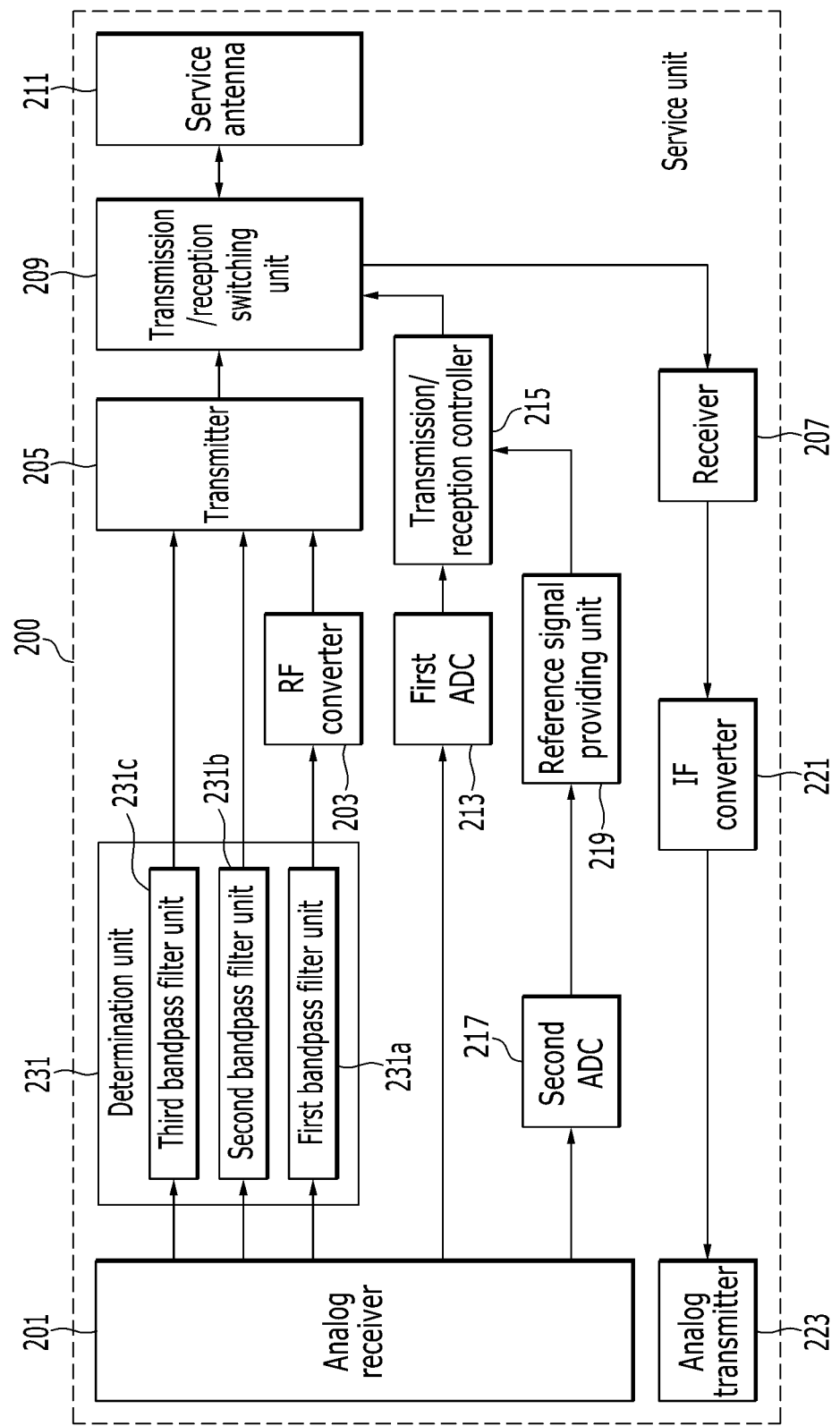
FIG. 10 is a block diagram illustrating the detailed configuration of the service unit according to yet another example in the present invention.

FIG. 10 is a block diagram illustrating the specific configuration of the service unit according to yet another example in the present invention. FIG. 10 corresponds to a case where the service unit is capable of adopting frequency bands different from each other and corresponds to the example in FIG. 6. At this time, the example in FIG. 10 can be implemented from the configuration in FIGS. 7, 8, and 9, but uses the configuration in FIG. 9 as an example. Here, descriptions of the same components as those in FIG. 7 will be omitted.

With reference to FIG. 10, in a case where an analog transmission signal in which the IF signal (or data signal) and the time synchronization signal (or control signal) are combined is provided, the analog receiver 201 separates the analog transmission signal by a demultiplexing technique. The IF signal is output to the determination unit 231, and the time synchronization signal is output to the first ADC 213.

The determination unit 231 is connected to the analog receiver 201 to divide the frequency band of the analog transmission signal input from the analog receiver 201. The determination unit 231 includes multiple bandpass filter units 231a, 231b, and 231c that pass through predetermined frequencies, respectively. The bandpass filter units 231a, 231b, and 231c correspond to the bandpass filter units 105a, 105b, and 105c in FIG. 6.

At this time, the first bandpass filter unit 231a filters the analog transmission signal in an IF band and outputs the filtered signal to the RF converter 203. The second bandpass filter unit 231b filters a second analog transmission signal, and the third bandpass filter unit 231c filters a third analog transmission signal. At this time, multiple second bandpass filter units 231b and multiple third bandpass filter units 231c may be provided, and data signals in radio frequency bands obtained by filtering are output to the transmitter 205 as the received signal is. Here, the second analog transmission signal and the third analog transmission signal are RF signals in service frequency bands, and each of the service frequency bands may be for a 3G frequency, an LTE frequency, and the like.

The RF converter 203 converts the IF signal which passes through the first bandpass filter unit 231a into a signal in the service frequency band and outputs the signal to the transmitter 205. Here, the service frequency band may be a millimeter wave band.

Figure 11:
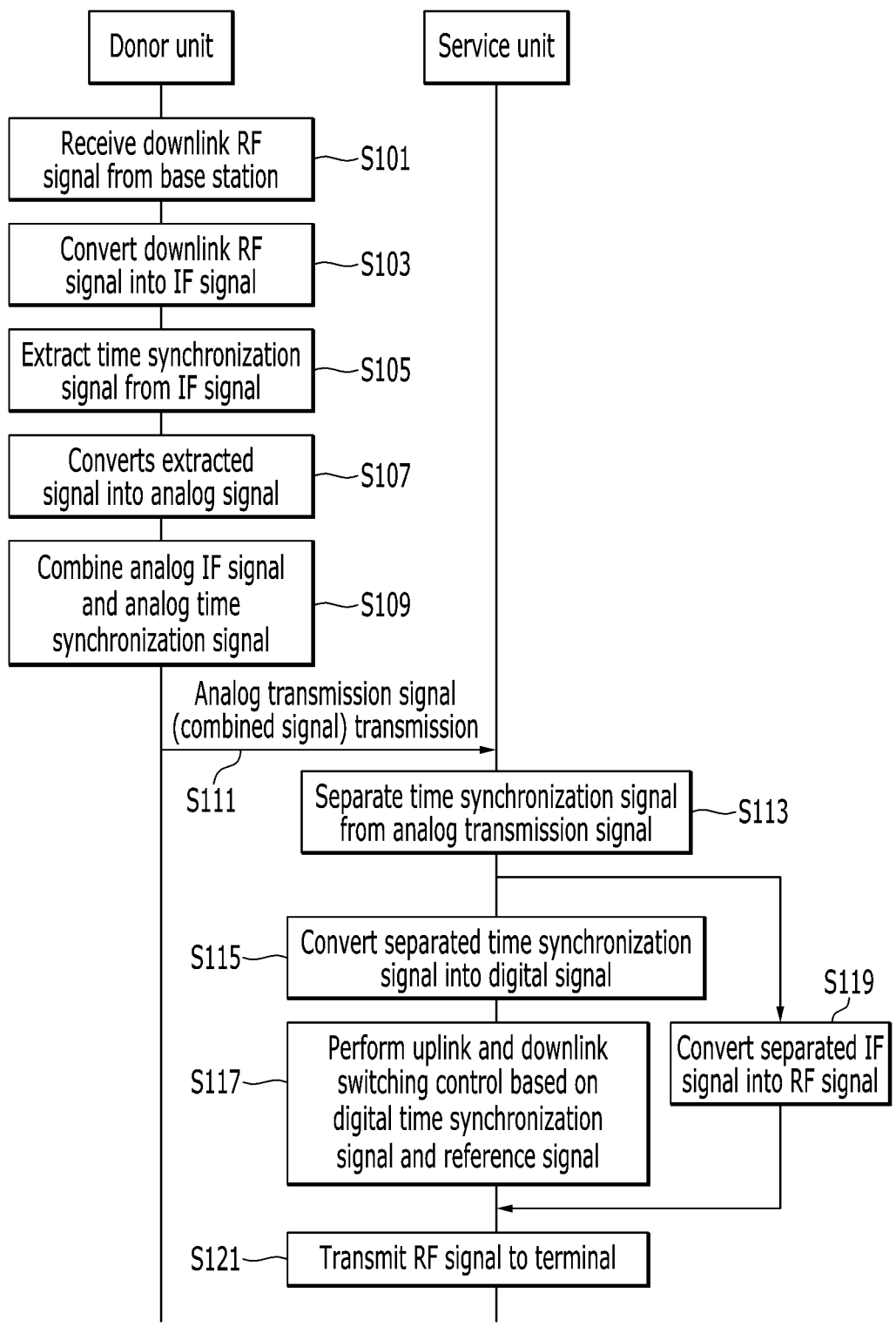
FIG. 11 is a flowchart illustrating a series of processes of a radio relay method according to an exemplary embodiment of the present invention.

FIG. 11 is a flowchart illustrating a series of processes of a radio relay method according to an exemplary embodiment of the present invention and illustrates a downlink process.

With reference to FIG. 11, if the donor unit 100 receives a downlink RF signal from the base station 20 (S101), the donor unit converts the downlink RF signal into an IF signal (S103).

The donor unit 100 detects a time synchronization signal from the converted (S103) IF signal (S105) and converts the detected time synchronization signal into an analog signal (S107).

The donor unit 100 generates an analog transmission signal by combining (S109) the IF signal converted in Step S103 and the time synchronization signal detected in Step S105. The donor unit 100 transmits the analog transmission signal to the service unit 200 (S111).

The service unit 200 separates the time synchronization signal from the analog transmission signal (S113). The service unit 200 converts the separated time synchronization signal into a digital signal (S115). The service unit 200 performs switching control between uplink transmission and downlink transmission based on the digital time synchronization signal and the reference signal (S117).

The service unit 200 converts the IF signal obtained by separating the time synchronization signal in Step S113, into an RF signal in a predetermined service frequency band (S119).

The service unit 200 transmits the RF signal converted in Step S119 to the terminal 30 (S121).

Figure 12:
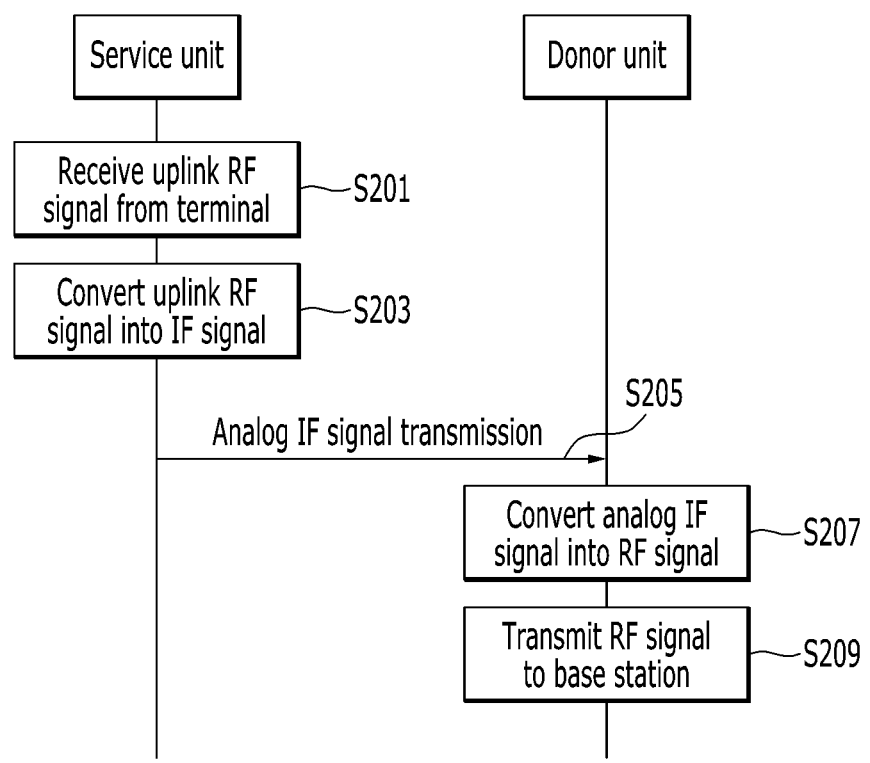
FIG. 12 is a flowchart illustrating a series of processes of a radio relay method according to another exemplary embodiment of the present invention.

FIG. 12 is a flowchart illustrating a series of processes of a radio relay method according to another exemplary embodiment of the present invention and illustrates an uplink process.

With reference to FIG. 12, the service unit 200 receives an uplink RF signal from the terminal (S201) and converts the uplink RF signal into an IF signal (S203). The service unit 200 transmits the converted (S203) analog IF signal to the donor unit 100 (S205).

The donor unit 100 converts the analog IF signal into an RF signal in a predetermined service frequency band (S207) and transmits the RF signal to the base station 20 (S209).

Figure 13:
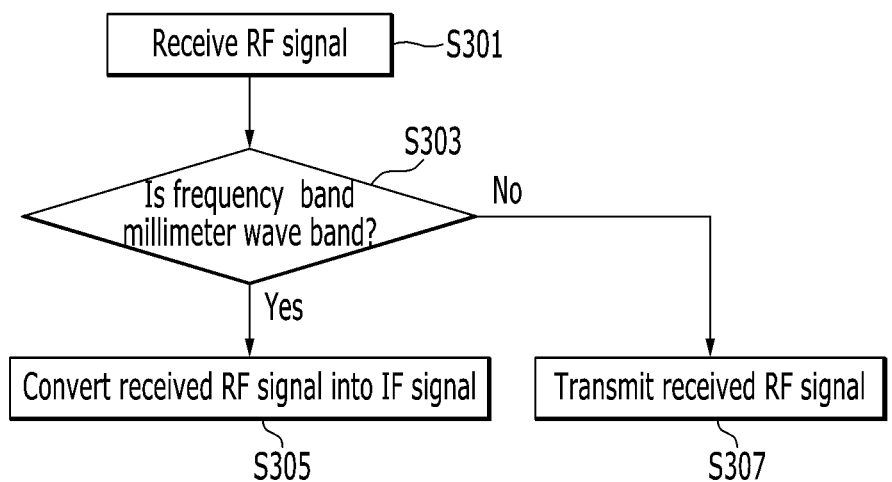
FIG. 13 is a flowchart illustrating a radio relay method according to yet another exemplary embodiment of the present invention.

FIG. 13 is a flowchart illustrating a radio relay method according to yet another exemplary embodiment of the present invention and corresponds to a case where the donor unit 100 processes signals in multiple different frequency bands.

With reference to FIG. 13, if the RF signal is received (S301), the donor unit 100 determines whether the frequency band is a millimeter wave band (S303). When the frequency band is the millimeter wave band, the donor unit converts the RF signal into an IF signal (S305). When the frequency band is not the millimeter wave band, the donor unit transmits the received RF signal itself to the service unit 200 (S307). Here, processes subsequent to Step S305 are as described with reference to FIGS. 3 and 4.

Figure 14:
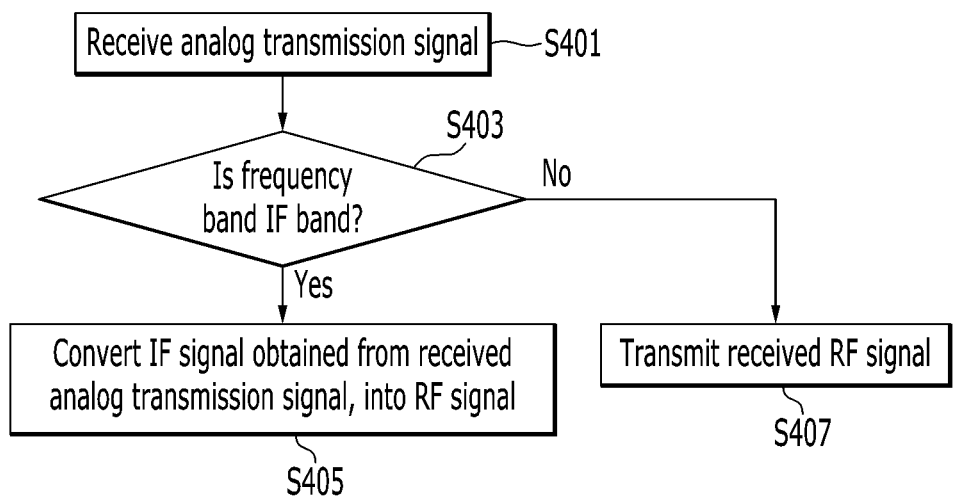
FIG. 14 is a flowchart illustrating a radio relay method according to yet another exemplary embodiment of the present invention.

FIG. 14 is a flowchart illustrating a radio relay method according to yet another exemplary embodiment of the present invention and corresponds to a case where the service unit 200 processes signals in multiple different frequency bands.

With reference to FIG. 14, if the analog transmission signal is received (S401), the service unit 200 determines whether the frequency band is an IF band (S403). At this time, the determination criterion is not limited to an IF band. In a case of a multiplexed signal, the service unit may determine whether the frequency band of the signal is within an IF band range including the frequency band of the time synchronization signal.

If the frequency band is within the IF band range, the service unit converts the IF signal obtained by separating the time synchronization signal from the analog transmission signal, into an RF signal (S405). Here, processes subsequent to Step S405 are as described with reference to FIGS. 7 and 8.

On the contrary, if the frequency band is not within the IF band range, the service unit transmits the received RF signal itself to the terminal 30 (S407).

Figure 15:
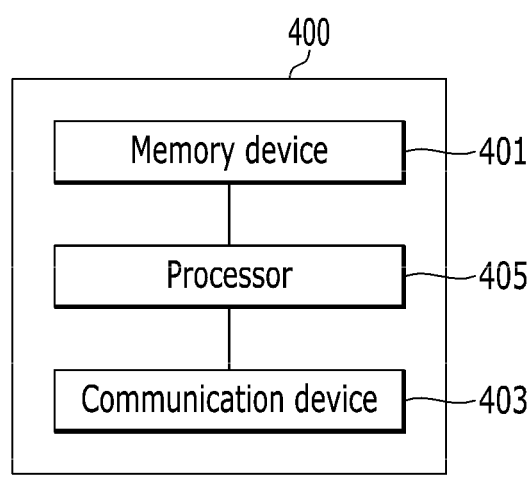
FIG. 15 is a block diagram illustrating a hardware configuration of a radio relay apparatus to which the exemplary embodiment of the present invention may be applied.

FIG. 15 is a block diagram illustrating a hardware configuration of a radio relay apparatus to which the exemplary embodiment of the present invention may be applied.

With reference to FIG. 15, a radio relay apparatus 400 includes a memory device 401, a communication device 403, and a processor 405. The memory device 401 is connected to the processor 405 so as to store a program including commands for performing the configuration and/or the method according to the exemplary embodiment, which are described with reference to FIGS. 1 to 10. The communication device 403 is connected to the processor 405 so as to transmits and/or receive a radio signal to and from the base station 20 and/or the terminal 30. The processor 405 executes the program stored in the memory device (401).

The exemplary embodiments of the present invention described above are not only implemented by the apparatus and the method, but may be implemented by a program for realizing functions corresponding to the configuration of the embodiments of the present invention or a recording medium on which the program is recorded.

While the embodiments of the present invention have been described in detail above, the scope of the present invention is not limited thereto, and various modifications and improvements of those skilled in the art using the basic concepts of the present invention defined in the appended claims also belongs to the scope of the present invention.

The invention claimed is:

1. A radio relay apparatus that relays a communication signal between a base station and a terminal, the radio relay apparatus comprising:
   a donor interface that transmits and receives a radio frequency signal to and from the base station; and
   at least one service interface that transmits and receives a transmission signal to and from the donor interface, and transmits and receives the radio frequency signal to and from the terminal,
   wherein the donor interface converts the radio frequency signal into an intermediate frequency (IF) signal, and combines the intermediate frequency (IF) signal and a time synchronization signal to generate the transmission signal, and
   wherein the time synchronization signal is used by the donor interface and the at least one service interface for time division duplex (TDD) communication synchronization control,
   wherein the at least one service interface separates the time synchronization signal from the transmission signal to extract the intermediate frequency (IF) signal, converts the intermediate frequency (IF) signal into the radio frequency signal, and transmits the radio frequency signal to the terminal.

2. The radio relay apparatus of claim 1, wherein:
   the donor interface detects the time synchronization signal from the intermediate frequency (IF) signal.

3. The radio relay apparatus of claim 1, wherein:
   the donor interface combines the intermediate frequency (IF) signal and the time synchronization signal using a frequency division multiplexing technique.

4. The radio relay apparatus of claim 1, wherein:
   the donor interface and the at least one service interface perform time division duplex communication (TDD) synchronization control based on a reference signal and the time synchronization signal, and
   the reference signal is periodically shared by the donor interface and the at least one service interface.

5. The radio relay apparatus of claim 1, wherein:
   the donor interface combines the intermediate frequency (IF) signal and the time synchronization signal using a wavelength division multiplexing (WDM) technique.

6. The radio relay apparatus of claim 1, wherein:
   the transmission signal includes the intermediate frequency (IF) signal having an analog optical signal form and the time synchronization signal having a digital optical signal form.

7. The radio relay apparatus of claim 1, wherein:
   the donor interface includes
   at least one donor antenna that transmits and receives an uplink radio frequency signal and a downlink radio frequency signal to and from the base station,
   an intermediate frequency (IF) converter that converts the downlink radio frequency signal into the intermediate frequency (IF) signal,
   a time synchronization signal extractor that extracts the time synchronization signal from the intermediate frequency (IF) signal,
   a transmission/reception controller that controls a transmission/reception switching operation for setting an uplink path and a downlink path based on a reference signal shared with the service interface and the time synchronization signal,
   a first digital-analog converter that converts the time synchronization signal into an analog signal,
   an analog transmitter that generates a downlink transmission signal by combining or multiplexing the intermediate frequency (IF) signal and the time synchronization signal converted into the analog signal and transmits the downlink transmission signal to the service interface,
   an analog receiver that receives an uplink transmission signal in an intermediate frequency (IF) band, from the service interface, and
   a radio frequency converter that converts the uplink transmission signal in the intermediate frequency (IF) band into a radio frequency signal in a service frequency band.

8. The radio relay apparatus of claim 1, wherein:
   the donor interface includes
   at least one donor antenna that transmits and receives an uplink radio frequency signal and a downlink radio frequency signal to and from the base station,
   an analog receiver that receives an uplink transmission signal in an intermediate frequency (IF) band, from the service interface,
   a radio frequency converter that converts the uplink transmission signal in the intermediate frequency (IF) band into a radio frequency signal in a service frequency band,
   an intermediate frequency (IF) converter that converts the downlink radio frequency signal into an intermediate frequency (IF) signal,
   a time synchronization signal extractor that extracts the time synchronization signal from the intermediate frequency (IF) signal,
   a transmission/reception controller that controls a transmission/reception switching operation for setting an uplink path and a downlink path based on a reference signal shared with the service interface and the time synchronization signal, and
   an optical signal combiner that transmits an optical transmission signal including the intermediate frequency (IF) signal and the time synchronization signal, to the service interface.

9. The radio relay apparatus of claim 1, wherein:
   the service interface includes
   at least one service antenna that transmits and receives an uplink radio frequency signal and a downlink radio frequency signal to and from the terminal,
   an analog receiver that receives a downlink transmission signal from the donor interface and separates the downlink transmission signal into the intermediate frequency (IF) signal and the time synchronization signal,
   a radio frequency converter that converts the intermediate frequency (IF) signal into the downlink radio frequency signal in a service frequency band,
   a first analog/digital converter that converts the time synchronization signal into a digital signal,
   a transmission/reception controller that controls a transmission/reception switching operation for setting an uplink path and a downlink path based on a reference signal shared with the donor interface and the time synchronization signal, an intermediate frequency (IF) converter that converts the uplink radio frequency signal received from the terminal through the service antenna, into an intermediate frequency (IF) signal, and an analog transmitter that transmits the intermediate frequency (IF) signal to the donor interface by an analog transmission method.

10. The radio relay apparatus of claim 1, wherein:

the service interface includes at least one service antenna that transmits and receives an uplink radio frequency signal and a downlink radio frequency signal to and from the terminal, an optical signal separator that receives an optical transmission signal including the intermediate frequency (IF) signal as an optical transmission signal and the time synchronization signal as a digital optical transmission signal from the donor interface, and separates and outputs the intermediate frequency (IF) signal and the time synchronization signal, a radio frequency converter that converts the intermediate frequency (IF) signal into the downlink radio frequency signal in a service frequency band, a transmission/reception controller that controls a transmission/reception switching operation for setting an uplink path and a downlink path based on the time synchronization signal and a reference signal shared with the donor interface, an intermediate frequency (IF) converter that converts the uplink radio frequency signal received from the terminal through the service antenna, into an intermediate frequency (IF) signal, and an analog transmitter that transmits the intermediate frequency (IF) signal to the donor interface by an analog transmission method.

11. An operating method of a donor interface in a radio relay apparatus including the donor interface that transmits and receives a radio frequency signal to and from a base station and a service interface that transmits and receives the radio frequency signal to and from a terminal, the method comprising:

receiving the radio frequency signal from the base station;

converting the radio frequency signal into an intermediate frequency (IF) signal;

generating a transmission signal including a time synchronization signal and the intermediate frequency (IF) signal;

transmitting the transmission signal to the service interface through a transmission cable;

detecting the time synchronization signal from the intermediate frequency (IF) signal;

converting the time synchronization signal into an analog time synchronization signal, and wherein the generating the transmission signal further comprises combining or multiplexing the analog time synchronization signal and the intermediate frequency (IF) signal.

12. The operating method of claim 11, wherein:

in the generating of the transmission signal, the transmission signal in which the intermediate frequency (IF) signal and the time synchronization signal are combined is generated using a wavelength division multiplexing (WDM) technique.

13. The operating method claim 11, wherein:

the transmission cable is an optical cable, the generating of the transmission signal includes generating an analog optical signal from the intermediate frequency (IF) signal, generating a digital optical transmission signal from the time synchronization signal, and generating the transmission signal including the analog optical signal and the digital optical transmission signal, and in the transmitting, the analog optical signal and the digital optical transmission signal are simultaneously transmitted with optical wavelengths different from each other.

14. An operating method of a service interface in a radio relay apparatus including a donor interface that transmits and receives a radio frequency signal to and from a base station and the service interface that transmits and receives the radio frequency signal to and from a terminal, the method comprising:

receiving an analog transmission signal from the donor interface through a transmission cable;

separating a time synchronization signal from the analog transmission signal;

converting an intermediate frequency (IF) signal obtained by separating the time synchronization signal, into a radio frequency signal in a predetermined frequency band; and transmitting the converted radio frequency signal to the terminal, wherein the time synchronization signal is used by the donor interface and the service interface for time division duplex (TDD) communication synchronization control.

15. The operating method of claim 14, wherein:

the transmission cable is an optical cable, and the transmission signal includes the intermediate frequency (IF) signal and the time synchronization signal which are simultaneously received with optical wavelengths different from each other, the intermediate frequency (IF) signal having an analog optical signal form, and the time synchronization signal having a digital optical transmission signal form.

16. A radio relay apparatus that relays a communication signal between a base station and a terminal, the radio relay apparatus comprising:

a donor interface that transmits and receives radio frequency signals in at least two or more service bands different from each other, to and from the base station; and at least one service interface that is connected to the donor interface, and transmits and receives the radio frequency signal to and from the terminal, wherein the donor interface and the at least one service interface convert a radio frequency signal in a first service band of the two or more service bands into an intermediate frequency (IF) signal, and transmit and receive the converted signal to and from each other through a transmission cable by an analog transmission method, and transmit and receive a radio frequency signal itself in another service band of the two or more service bands to and from each other, and wherein the intermediate frequency (IF) signal is converted into the radio frequency signal in the first service band by the at least one service interface and then is transmitted to the terminal, or is converted into the radio frequency signal in the first service band by the donor interface and then is transmitted to the base station.

17. The radio relay apparatus of claim 16, wherein:

the donor interface and the at least one service interface transmit and receive an analog transmission signal to and from each other, the analog transmission signal including the intermediate frequency (IF) signal into which the radio frequency signal in the first service band is converted, and a time synchronization signal extracted from the intermediate frequency (IF) signal.

18. The radio relay apparatus of claim 17, wherein:
the donor interface and the at least one service interface transmit and receive the intermediate frequency (IF) signal to and from each other through the transmission cable, and transmit and receive the time synchronization signal to and from each other through a frequency-shift keying modem.

19. The radio relay apparatus of claim 17, wherein:
the donor interface and the at least one service interface transmit and receive a transmission signal in which the intermediate frequency (IF) signal and the time synchronization signal are combined using a frequency division multiplexing technique, to and from each other.

20. The radio relay apparatus of claim 17, wherein:
the donor interface and the at least one service interface transmit and receive a transmission signal in which the intermediate frequency (IF) signal and the time synchronization signal are combined using a wavelength division multiplexing (WDM) technique, to and from each other.

21. The radio relay apparatus of claim 17, wherein:
the donor interface and the at least one service interface transmit and receive the intermediate frequency (IF) signal to and from each other by an analog optical transmission method, and transmit and receive the time synchronization signal to and from each other by a digital optical transmission method, and the intermediate frequency (IF) signal and the time synchronization signal are simultaneously transmitted and received.

22. An operating method of a donor interface in a radio relay apparatus including the donor interface that transmits and receives a radio frequency signal to and from a base station and a service interface that transmits and receives the radio frequency signal to and from a terminal, the method comprising:
converting the radio frequency signal into an intermediate frequency (IF) signal in a case where a service band of the radio frequency signal received from the base station is a first service band among two or more different radio frequency bands allowing transmission and reception to and from the base station;
transmitting the intermediate frequency (IF) signal to the service interface through a transmission cable; and
transmitting the received radio frequency signal itself to the service interface through the transmission cable in a case where the service band is other than the first service band.

23. The operating method of claim 22, wherein:
in the transmitting of the intermediate frequency (IF) signal to the service interface through the transmission cable,
a time synchronization signal extracted from the intermediate frequency (IF) signal and the intermediate frequency (IF) signal are transmitted by one transmission method selected from a first transmission method, a second transmission method, and a third transmission method,
the first transmission method includes an analog transmission method of combining or multiplexing the intermediate frequency (IF) signal and the time synchronization signal,
in the second transmission method, the intermediate frequency (IF) signal is transmitted through the transmission cable, and the time synchronization signal is transmitted through a frequency-shift keying (FSK) modem, and
in the third transmission method, the intermediate frequency (IF) signal is transmitted by the analog optical transmission method, and the time synchronization signal is transmitted by the digital optical transmission method.

* * * * *